(12) United States Patent
Siegrist

(10) Patent No.: US 8,117,084 B2
(45) Date of Patent: Feb. 14, 2012

(54) METHOD AND APPARATUS FOR CONVERTING FORM INFORMATION TO PHONE CALL

(75) Inventor: Joseph Siegrist, Vienna, VA (US)

(73) Assignee: Art Technology, Inc., Cambridge, MA (US)

( * ) Notice: Subject to any disclaimer, the term of this patent is extended or adjusted under 35 U.S.C. 154(b) by 1409 days.

(21) Appl. No.: 11/671,663

(22) Filed: Feb. 6, 2007

(65) Prior Publication Data

US 2008/0187125 A1 Aug. 7, 2008

(51) Int. Cl.
*G06Q 30/00* (2006.01)
*G06F 17/30* (2006.01)

(52) U.S. Cl. .............. 705/26.41; 705/26.1; 705/27.1; 705/304

(58) Field of Classification Search ............. 705/14.4, 705/14.51, 14.58, 14.65, 14.68, 14.73, 26.1–27.2, 705/304
See application file for complete search history.

(56) References Cited

U.S. PATENT DOCUMENTS

| | | | |
|---|---|---|---|
| 6,134,318 A | 10/2000 | O'Neil | |
| 6,349,290 B1 * | 2/2002 | Horowitz et al. | 705/35 |
| 6,385,646 B1 | 5/2002 | Brown et al. | |
| 6,389,400 B1 | 5/2002 | Bushey et al. | |
| 6,868,389 B1 | 3/2005 | Wilkins et al. | |
| 6,889,195 B2 | 5/2005 | Strandberg | |
| 7,146,337 B1 | 12/2006 | Ward et al. | |
| 2002/0077924 A1 | 6/2002 | Spetner et al. | |
| 2002/0087420 A1 | 7/2002 | Higgins et al. | |
| 2003/0050851 A1 * | 3/2003 | Vaccaro | 705/26 |
| 2003/0059027 A1 * | 3/2003 | Plarre et al. | 379/229 |
| 2004/0044585 A1 | 3/2004 | Franco | |
| 2004/0098297 A1 * | 5/2004 | Borthwick | 705/10 |
| 2004/0202305 A1 * | 10/2004 | Brennan | 379/211.04 |
| 2005/0097000 A1 | 5/2005 | Freishtat et al. | |
| 2005/0154648 A1 | 7/2005 | Strause | |
| 2005/0182672 A1 * | 8/2005 | Hemm et al. | 705/9 |
| 2006/0287929 A1 | 12/2006 | Bae et al. | |
| 2007/0041527 A1 * | 2/2007 | Tuchman et al. | 379/88.22 |
| 2007/0083408 A1 * | 4/2007 | Altberg et al. | 705/7 |
| 2008/0010133 A1 * | 1/2008 | Pyhalammi et al. | 705/14 |
| 2008/0095333 A1 * | 4/2008 | Tudor | 379/88.17 |
| 2008/0139209 A1 * | 6/2008 | Dennert et al. | 455/445 |
| 2008/0140398 A1 * | 6/2008 | Shpigel | 704/235 |
| 2008/0192923 A1 * | 8/2008 | Ruckart | 379/265.09 |

OTHER PUBLICATIONS

RealSystem superbly streams. Senna, Jeff Seoane, Dan InfoWorld, v21n11, p. 61, Mar. 15, 1999.*

* cited by examiner

*Primary Examiner* — Will Allen
(74) *Attorney, Agent, or Firm* — Squire Sanders (US) LLP

(57) ABSTRACT

A method and apparatus for establishing a phone call between a potential customer viewing information on the internet and a sales agent includes the steps of receiving a message indicating that the customer wishes to be contacted and including contact information for the customer and other information, converting at least some of the information in the message to speech, establishing a phone call to the sales agents, playing the speech to the sales agent, establishing a phone call to the customer using the contact information in the message, and bridging the first call to the second call. In some embodiments, a text message such as email or SMS is sent in addition to the phone call to the sales agent or when the phone call to the sales agent cannot be completed.

27 Claims, 7 Drawing Sheets

Search for any car

Home | Research | Buy New | Buy Used | Financing | Photo

You are here: <u>Home</u> > <u>Buy</u> > Used Car Prices > Used Cars for Sale

Used Chrysler
*Find local cars, trucks and SUVs for sale*

NEWSLI
KEEP UP WIT

Category Search   Payment Search   Basic Search

ADVER

SEARCH LOCAL INVENTORY

Search for used cars, trucks, suvs, and mini vans in your area from both dealers and private parties. Many have photos, are certified, guaranteed, and/or warranted, see individual vehicles for details.

| | |
|---|---|
| Make | Chrysler |
| Model | Sebring |
| Year | 2004 and newer |
| Price Range | $5,000 to $20,000 |
| ZIP | 20841 |
| Distance | 25  Miles |

Quick Links
» Get Blue Book® Values
» Compare Vehicles
» Used Car Loan
» Get a Free VIN Check ◉ Show all vehicles
○ Show only <u>Certified Pre-Owned</u> Vehicles

SEARCH >>

Used Car Buying Guide

Included you'll find:
- Choosing A Used Car
- Saving Money: Buying Tips That Can Save You Thousands
- How to Inspect A Used Car
- Checking the VIN Before Buying
- Top Ten Used Car List

Email:

Zip Code:

Sign Up!

RESEARCH / TOP 10 CARS / FINANCING

Figure 2

Search for any car

Home | Research | Buy New | Buy Used | Financing | Photc

You are here: Home > Buy > Used Car Prices > Used Cars for Sale > Search Results All Vehicles  Certified Vehicles Only

NEWSLI
KEEP UP WIT

YOUR SEARCH RESULTS

Chrysler Sebring near Boyds, Maryland

ADVER 28 vehicles within 25 miles of 20841
Price Range: $5000 - $20000
Year: 2004 - 2006

MODIFY SEARCH >>

Sort By: Year

SELECT UP TO 3 VEHICLES AND COMPARE

Page 1 ▶ ▶▶

| Compare | Vehicle | Distance | Mileage | Price |
|---|---|---|---|---|
| ☐ | 2006 Sebring | 20 mi. | 19,079 mi. | $12,950 |
| | Sedan; SEBRING * 9 Photos! * Great on Gas! 2.4L 4cyl Auto Cloth CD Player Power Windows and Locks Keyless Entry ...more | | | (888) 258-2414 |
| | Color: Inferno Red Crystal Pearl | View This Dealer's Entire Inventory | | Contact Seller |
| ☐ | 2006 Sebring | 20 mi. | 14,124 mi. | $13,450 |
| | Sedan; SEBRING * 9 Photos! * Extra Nice!! 2.4L 4 Cyl Automatic Cloth CD Player Power Window and Locks Keyless En...more | | | (888) 258-2414 |
| | Color: Midnight Blue Pearl | View This Dealer's Entire Inventory | | Contact Seller |
| ☐ | 2006 Sebring | 10 mi. | 21,577 mi. | $12,999 |
| | Power Windows,Alloy Wheels,Power Door Locks,Single Compact Disc,Power Steering,Tilt Wheel,Air Conditioning,Cruise Con...more | | | (866) 589-3062 |
| | Color: Silver | View This Dealer's Entire Inventory | | Contact Seller |
| ☐ | 2006 Sebring Convertible Touring | 21 mi. | 17,837 mi. | $14,988 |
| | 165 L V6,2 Door Car Automatic,4 Wheel Disc Brakes,Air Conditioning,Fog/Driving Lamps,Keyless Entry,Leather Seats,Powe...more | | | (866) 214-5879 |
| | Color: Blue | View This Dealer's Entire Inventory | | Contact Seller |
| ☐ | 2006 Sebring Convertible Touring | 21 mi. | 20,128 mi. | $15,488 |
| | 165 L V6,2 Door Car Automatic,4 Wheel Disc Brakes,Front Disc Brakes,Air Conditioning,Fog/Driving Lamps,Rear Defrost,K...more | | | (866) 214-5879 |
| | Color: Grey | View This Dealer's Entire Inventory | | Contact Seller |
| ☐ | 2006 Sebring Convertible Touring | 21 mi. | 18,676 mi. | $15,488 |
| | 165 L V6,2 Door Car Automatic,4 Wheel Disc Brakes,Front Disc Brakes,Air Conditioning,Fog/Driving Lamps,Rear Defrost,R...more | | | (866) 214-5879 |
| | Color: White | View This Dealer's Entire Inventory | | Contact Seller |
| ☐ | 2006 Sebring Convertible Touring | 21 mi. | 20,902 mi. | $15,488 |
| | 165 L V6,2 Door Car Automatic,4 Wheel Disc Brakes,Air Conditioning,Rear | | | (866) 214-5879 |

Figure 3

**See other vehicles *at this dealership*** (20 miles from 20841)

Passenger Cars in this Price Range
All vehicles in this Price Range
Passenger Cars, Regardless of Price
All Vehicles

Car Buying Tools

Financing:           Finance this car!
Extended Warranty: Get Free Quote
Insurance:           Research rates & Save on car insurance.

☑ Yes, send me the monthly Autobytel newsletter for the latest automotive trends, news, and vehicle reviews. Also include rebates, recalls, service reminders and other important information from Autobytel.

☑ Yes, I'd like to receive new vehicle announcements, promotions and incentive offers from auto manufacturers and Autobytel partners.

*Required

[Submit]

If you're buyer, hov did you ty 10 years shopped

○
○
○
○
○

[Vote]

432

Kelley Blue Book® and Blue Book® are registered trademarks of Kelley Blue Book Co., Inc.

Figure 4(b)

METHOD AND APPARATUS FOR CONVERTING FORM INFORMATION TO PHONE CALL

BACKGROUND

The use of the Internet has become widespread over the last decade. An important use of the Internet is e-commerce. One form of e-commerce conducted over the internet involves advertising goods and services on websites. The advertising may be performed on the website of the provider of the goods/services, or may take the form of "ads" placed on the websites of others and/or in banners or pop-ups.

An advantage of advertising on the Internet is that the Internet facilitates communication between a potential customer who views the advertisement and the provider of goods and services in ways that traditional media such as print, radio and television do not. This communication can take many forms. For example, some websites provide a link that, when activated, will create a draft email addressed to the provider associated with the email. The potential customer can then type in his/her contact information and possibly information about the product or service in which the customer is interested along with any other comments they wish to make. The potential customer then sends the email to the provider.

Another form of communication allows a customer to request a contact from a sales agent by entering identification information (e.g., phone number, email address, mailing address, etc.) on a form provided by a website. This information is then forwarded to the sales agent, often in the form of an email or other electronic information, so that the sales agent can contact the potential customer.

Yet another form of communication involves the provision of a link or icon that, when activated by a potential customer, results in the initiation of a phone call between the potential user and the provider. Examples of such techniques can be found in U.S. Pat. No. 6,707,811, commonly owned by the assignee of the present application the contents of which are hereby incorporated herein. It should be noted that such phone calls can take the form of call back (i.e., the customer provides a telephone number at which they desire to be called regarding the product/service) phone calls conducted entirely over the PSTN (public switched network), pure VOIP (Voice Over Internet Protocol) calls, or mixed VOIP calls in which one party is connected to the call via the PSTN and the other party (typically the customer) is connected via the Internet using their computer speakers and microphone.

It has been discovered that the aforementioned communication techniques are not always desirable and/or effective. In particular, when email is chosen as the form of communication to notify the sales agent of the customer's desire for information/contact, it has been discovered that the email notifications will often go unanswered for unacceptably long periods if they are answered at all. While there are many potential causes for this poor response (messages may get missed due to inboxes crowded with junk mail; lack of access to, or comfort with, email on the part of sales agents; etc.), the problem is real regardless of the cause. In the case of a PSTN call back or VOIP or mixed VOIP call, providing information to the sales agent about the customer and about the product in which they are interested can be problematic. While the aforementioned patent provides techniques that may be used with a sophisticated customer service call center, many smaller businesses rely on simple PSTN telephone communications. In such a situation, the sales agent must obtain the customer identification and product information from the consumer when a PSTN call back or VOIP call is initiated. This can be annoying to potential customers.

SUMMARY

The aforementioned issues and others are addressed to a great extent by a system and method in which textual information pertaining to a potential customer on a website is converted to speech form and communicated to the sales agent in a telephone call. Preferably, the telephone call is then bridged to the potential customer. The phone call is preferably a PSTN phone call, but may also be a mixed VOIP phone call and/or a pure VOIP phone call. The types of textual information pertaining to the customer can be almost any type of information, and can include the customer's name, address, telephone number, account/identification number, email address, and can further include information that identifies the product or service in which the customer is interested, any price range indicated by the customer, etc. This information can include both information the customer enters and information that is displayed on the web page but not necessarily entered by the customer (e.g., a product number). Preferably, the phone call between the customer and the sales agent is initiated shortly after the customer first expresses interest in a product on the website.

In some embodiments, a "find-me" feature is included. The find-me feature will attempt to located a sales agent to which the phone call is directed by placing calls to multiple telephone numbers (e.g., a direct PSTN line to the sales agent's desk; a cell phone for the sales agent; a main number; etc.) for the sales agent, either sequentially or in parallel, until the sales agent actually answers the phone call. Some embodiments are also configured to send an SMS message with some or all of the aforementioned information to the agent's cellphone, which may be in addition to the attempted phone calls discussed above. In some embodiments, the "find me" feature is directed to a particular sales agents, whereas contact attempts are made to a plurality of sales agents, sequentially or in parallel, until one of the plurality of sales agents is located in other embodiments.

In some embodiments, the sales agent is given the option of accepting the sales lead before the contact information for the customer is disclosed to the sales agent. This feature is particularly useful in situations in which a third party acts as a liaison between the sales agent and the customer and is paid based on the number of sales leads accepted by the sales agent. In some embodiments, the telephone calls between sales agents and customers are tracked and reported to an entity such as the employer of the sales agent so that the effectiveness of the phone calls can be determined.

BRIEF DESCRIPTION OF THE DRAWINGS

FIG. 2 is a screen shot of a world wide web site according to one embodiment.

FIG. 3 is a second screen shot from the world wide web site of FIG. 2.

DETAILED DESCRIPTION

In the following detailed description, a plurality of specific details, such as the content of various messages and methods for establishing conference calls between a customer and a sales agent, are set forth in order to provide a thorough understanding of the preferred embodiments discussed below. The details discussed in connection with the preferred embodiments should not be understood to limit the present invention. Furthermore, for ease of understanding, certain method steps are delineated as separate steps; however, these steps should not be construed as necessarily distinct nor order dependent in their performance.

The embodiments discussed below are believed to be particularly applicable in the context of small businesses without sophisticated customer relationship management (CRM) systems and hence is primarily discussed in such a context herein. However, the invention should not be understood to be so limited and may be used in a wide variety of contexts.

Moreover, the embodiments and methods discussed above and below are not limited to a sales environment and may also be used in conjunction with any situation in which a person is seeking information and wishes to be connected with another person via a telephone call (PSTN, VOIP, or otherwise).

Figure 1:
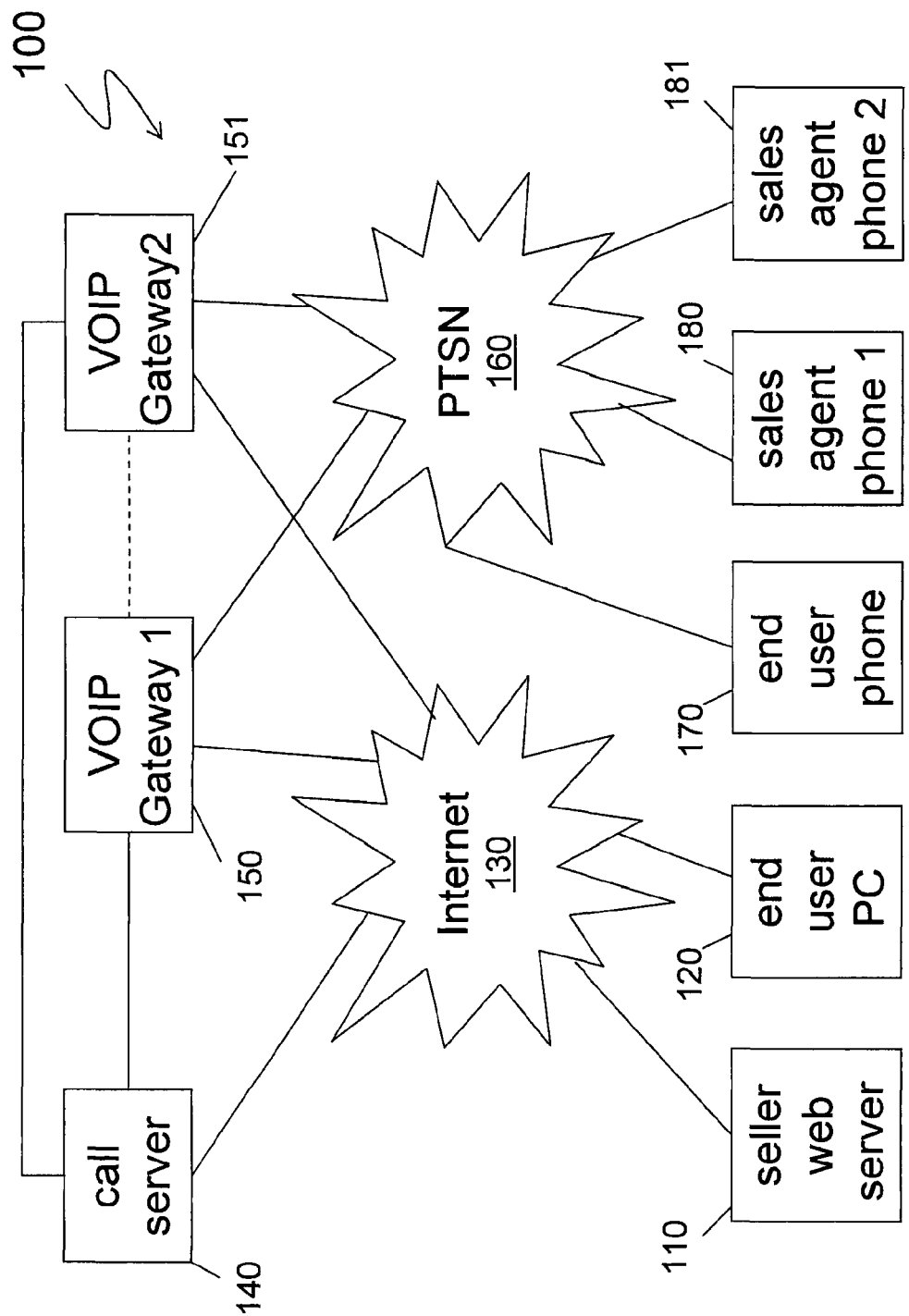
FIG. 1 is a block diagram of a system of a system for converting form information to a phone call according to an embodiment of the invention.

FIG. 1 illustrates a system 100 for converting form information to a phone call to a sales agent according to one embodiment. The system 100 includes a seller web server 110 on which is stored the content for a seller website and an end user PC 120 connected to each other through the Internet 130 (those of skill in the art will recognize that any network could be used in place of the Internet 130). The seller website includes text boxes, menus and other known devices by which a potential customer may enter and/or select information about themselves and products in which they are interested at end user PC 120. The website also includes a provision by which a potential customer may indicate a desire for contact by a sales agent associated with the seller.

Also connected to the Internet is a call server 140. The call server 140 is connected to receive a message, which may come from either an end user PC 120 or a seller web server 110, indicating that a potential customer wishes to be contacted by a sales agent. Preferably, the message includes a phone number for the potential customer and is in the form of a "loaded" URL (uniform resource locator).

The call server 140 is connected to a plurality of VOIP gateways 150, 151 (two VOIP gateways are shown in FIG. 1, but additional VOIP gateways are present in other embodiments). While a direct connection between the call server 140 and VOIP gateways 150, 151 is shown in FIG. 1, it should be understood that communications between the call serve 140 and the VOIP gateways 150, 151 may also be conducted via the Internet 130. The VOIP gateways, which are available from a variety of sources such as CISCO™, have the ability to convert a call from the PSTN (public switched telephone network) 160 to a VOIP (voice over Internet protocol) phone call. A dashed line connecting the gateways 150, 151 to indicate that it is possible to connect the gateways together such that the output of one gateway is connected to the input of another and vice versa (the reasons for doing this will be explained in further detail below).

Also shown in FIG. 1 are an end user phone 170 and two sales agent phones 180, 181. The phones 170, 180, and 181 may be any type of phones, including conventional telephones, cellular telephones, satellite phones, VOIP phones, etc., and may be connected to the PSTN directly or through a private branch exchange (PBX) or any other means. Although two sales agent phones 180, 181 are shown in FIG. 1, is should be understood than any number of sales agent phones may be employed.

Operation of the system 100 of FIG. 1 in one embodiment will now be described with reference to FIGS. 2-4, which are screen shots of a series of pages from an exemplary auto sales website displayed on a conventional personal computer equipped with a browser such as INTERNET EXPLORER available from MICROSOFT. The process begins when the customer navigates the website to find a car in which he/she is interested. For example, the customer uses various pull down menus to may specify that he/she is interested in a used 2004 Chrysler Sebring (menus 202, 204, 206) in the price range of $5,000-$20,000 (menus 208, 210) and that he/she is in the 20841 zip code (text box 212) and wants to see cars that are within 25 miles (menu 114) of that zip code as shown in FIG. 2.

Figure 4A:
FIGS. 4(*a*) and 4(*b*) are a third screen shot from the world wide web site of FIG. 2.

A series of cars that match the criteria indicated by the user is displayed to the user as indicated in FIG. 3. When the user clicks on one of the cars, a detailed description of the car is presented to the user as shown in FIGS. 4(a) and 4(b). The user is also presented with two options 410, 420 for receiving additional information about the car. The first option 410 is for the consumer to call the dealership at a telephone number 412 provided on the web page. The second option 420 is to submit a contact request via email.

When the second option 420 is selected, the customer enters his/her first and last name in text boxes 422, 424, his/her street address in text box 426 (the zip code specified in text box 212 of FIG. 2 is used to determine the city and state), phone number in text box 428 and email address in text box 430. When the customer presses the submit button 432, a message is sent to from the end user PC 120 to the seller's web server 110, and the message is relayed to the call server 140 (in other embodiments, the message may be sent directly from the end user PC 120 to the call server 140). The message can take the form of a URL, which may include the information entered by the customer, such as the customer's name, address, phone number and other information such as an identification number of the car in which the customer is interested.

Figure 5A:
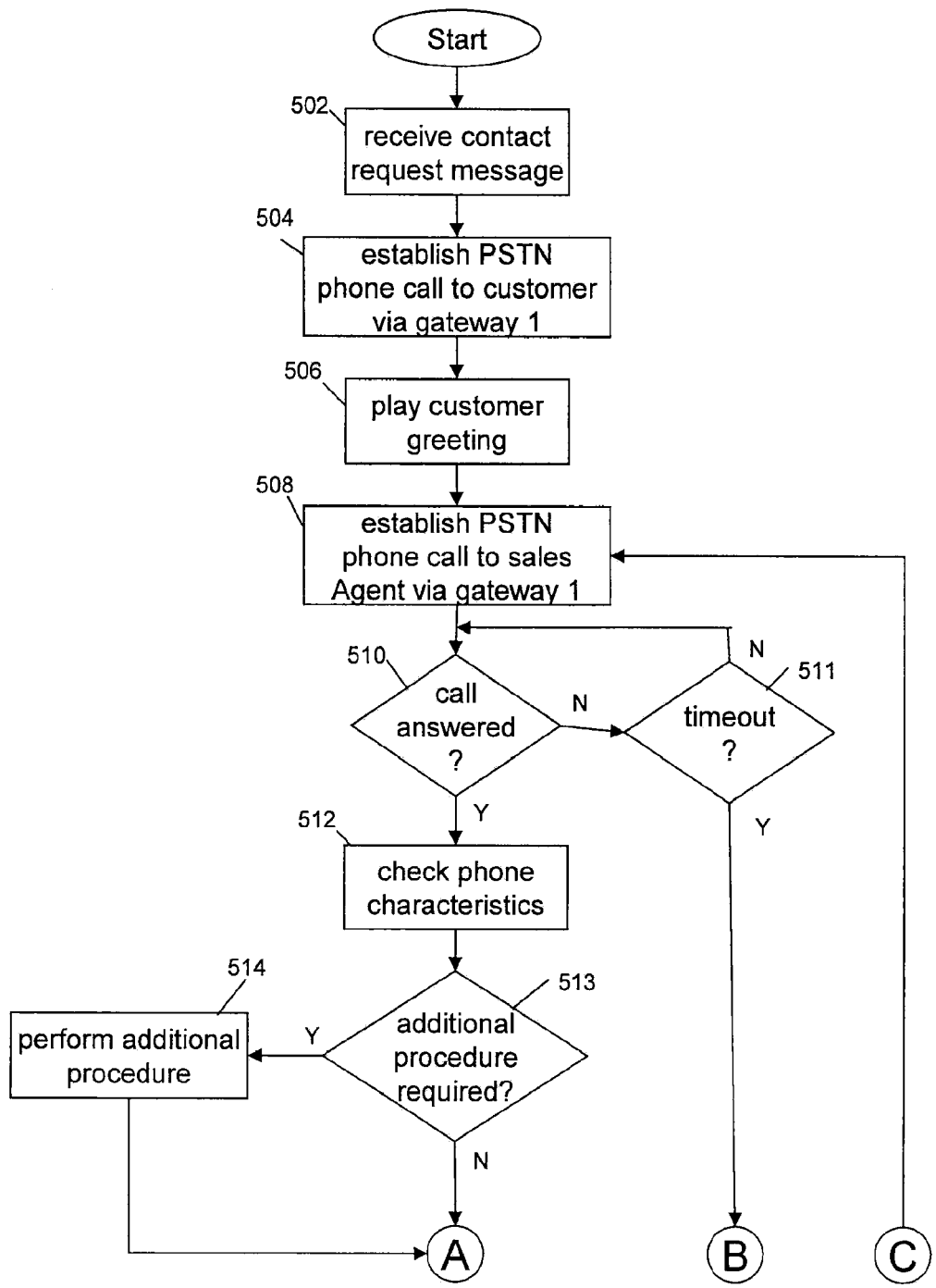
FIGS. 5(*a*) and 5(*b*) are a flow chart illustrating operation of the system of FIG. 1 in an embodiment.
Figure 5B:
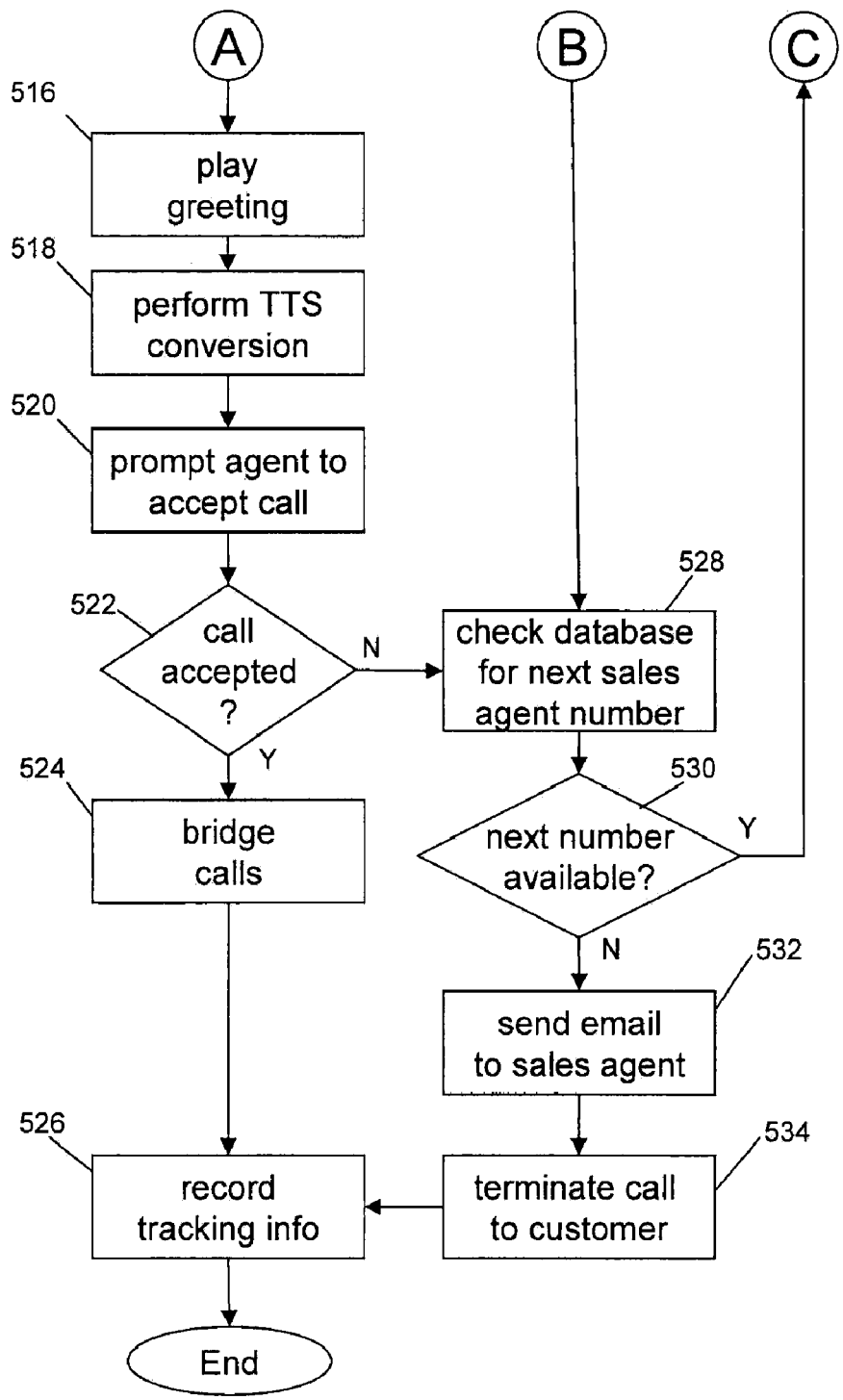

The processing performed by the call server 140 upon receipt of the message will now be discussed with reference to the flowchart 500 of FIG. 5. When the call server 140 receives the URL (or other message) requesting at step 502, the call server 140 commands the first gateway 501 to establish a PSTN telephone call to end user's phone 170 at step 504 using the number provided in the message. When the customer answers the phone, the call server 140 plays a greeting to the customer. This greeting preferably includes a spoken message telling the customer that the seller is being contacted and may be followed by the sound of a telephone ringing or music while the customer is on hold.

The call server 140 then commands at step 508 the second gateway 151 to place a second call to a first telephone number established by the merchant for the product selected by the customer. The phone number(s) established by the agent are maintained in a database connected to the call server 140 (not shown in FIG. 1). The database preferably also indicates characteristics of each phone number, such as whether the phone number is associated with an interactive voice response (IVR) system (and, if so, any additional information needed to reach the intended recipient), a person, or both. In this example, each dealership may establish one or more phone numbers to be called for all cars advertised by the dealership, or may establish phone numbers based on the type of product (e.g, whether the car is new or used, whether the car is foreign or domestic, etc.) or service, or any other desired basis.

If the call is answered at step 510, the call server 140 checks the database to determine the characteristics associated with the phone number at step 512. If the phone characteristics indicate that an additional procedure is required, such as emitting one or more DTMF tones in instances where the phone is associated with an IVR to reach the intended recipient), the additional procedure is performed at step 514. Next, or if no additional procedure was required at step 513, the call server 140 plays an optional greeting (which can be a short tone) at step 516 and then, using a text-to-speech (TTS) module, converts information in the message to audible form for the agent at step 518. An exemplary audible message is "Hello—a customer named John Doe is interested in a Chrysler Sebring, number IC3EL46XX66N20838."

In some embodiments, the sales agent is then prompted to indicate whether the call will be accepted at step 520. The prompt may take the form of the following message: "Press 1 to accept this lead." This prompt two purposes: 1) it ensures that a human being, rather than an answering machine, has answered the phone; and 2) in embodiments in which the organization for whom the sales agent works is billed for each lead, it provides an opportunity to refuse the lead and avoid the associated charges. If the sales agent accepts the call at step 522, (e.g, by pressing "1" key on his telephone keypad), the calls to the sales agent and the potential customer are bridged at step 524 and call tracking information is stored in the database for reporting at a later time at step 526. The call tracking information stored in the database can include any type of information about the call, such as date, time, length of the call, customer information, the telephone number(s) of the sales agent that was called, the identity of the product in which the customer was interested, etc. The tracking information can also include other information in the initial message received by the call server 140. For example, some sellers may wish to know the particular web page from which the customer made the request, a search term entered by the customer prior to making the request, etc. Such information can be included in the message sent to the call server 140 and hence can be included in the tracking information reported to the seller.

As discussed above, some embodiments allow for one or more sales agent phone numbers. The additional number may be another telephone number associated with a particular sales agent (e.g., the first number may be a direct line to the sales agent's desk and the second number may be a cell phone number for the same sales agent), or may be a number for another sales agent, or may be a main number for the corresponding merchant. Any number of additional numbers may be stored in the database. In the embodiment discussed above in connection with FIGS. 5(*a*) and 5(*b*), additional sales agent phone numbers will be dialed sequentially if the first phone call does not result in an acceptance by the sales agent. Thus, if the call to the sales agent is not answered at step 510, the call server 140 determines whether a time out has been reached at step 511. The time out may be a period of time (e.g., 30 seconds). If the time out has not been reached at step 511, step 510 is repeated. If, however, the time out is reached at step 511, the call server 140 checks the database to determine whether another sales agent number is present at step 528. Similarly, if the sales agent call is not accepted at step 522 (which may occur, for example, when no human is present and the call is answered by an answering machine), the result is also that step 528 is performed. If an additional sales agent phone number is available from the database at step 530, step 508 is repeated using the additional sales agent phone number. If no additional number is present in the database, some embodiments will send a text message such as an email and/or a SMS (short message service) message to the sales agent at step 532. (In other embodiments, a text message such as email or SMS is sent to the sales agent as part of the attempt to reach the sales agent). The call to the customer is then terminated at step 534. The termination may include playing a short message to the customer informing them that the sales agent is not available. Step 526 is then performed to record tracking information for the attempted call.

One aspect of the embodiments discussed above is that they may be used such that a potential customer who views the seller's information on the Internet can quickly (i.e., in just a few seconds or minutes) be put in contact with a sales agent who has been told who the potential customer is and what they are interested in, and that this result may be achieved without requiring any specialized equipment at the seller's premises. For example, in an embodiment used in conjunction with a website such as autobyte1.com, a customer who indicates a desire to speak to a sales agent about a particular car can receive a phone call from a specific sales agent who has been told who the customer is and what car the customer is interested in, even if the sales agent is away from his desk and it is necessary to contact him on his cell phone when the customer calls. This ability to rapidly connect an interested customer with a sales agent is believed to be a particularly effective sales technique, especially for small businesses that might not have sophisticated CRM systems. It should be understood, however, that the embodiments and methods discussed above, as well as those discussed below, are applicable in a wide variety of settings including large businesses with or without sophisticated CRM systems and with or without call centers and/or dedicated telephone sales personnel.

Other embodiments vary from the embodiments discussed above in numerous ways. In some embodiments, only a single number for a sales agent is supported. In some embodiments, the sales agent is contacted prior to the customer. In the embodiments discussed above, the customer is called first. One reason for this is to make a favorable impression on the customer by rapidly responding to their inquiry. In other embodiments, especially those used in situations in which it is less likely that a sales agent will be reached quickly, the sales agent is contacted first so as avoid annoying the customer by having them wait for long periods of time while the call to the sales agent is completed.

In the embodiments discussed above in connection with FIGS. 1-5, the call to both the customer and the sales agent is made using the PSTN. However, it is also possible to perform either or both of these calls via the Internet. The use of VOIP gateways facilitate such calls. For example, if the seller website provides an option for a call to the end user PC 120, the voice packets to/from the end user PC 120 can be directed toward the VOIP gateway 150, which can communicate with the sales agent via the PSTN. U.S. Pat. Nos. 6,661,878, 6,026,087, 6,791,974, and 6,707,811 discuss various methods and devices for conducting calls that are wholly or partially conducted via the Internet. The contents of these patents are hereby incorporated by reference herein.

In the embodiments discussed above, the multiple sales agent phone numbers are dialed sequentially. In other embodiments, the sales agent phone numbers are dialed in parallel using multiple VOIP gateways 151 until one of the sales agents answers the phone call.

Those of skill in the art will recognize that devices other than VOIP gateways can be used to make calls to the sales agents and customers. For example, a conventional conference call bridge may be used in place of the two VOIP gateways 150, 151 when both sales agent and the customer are to be called via the PSTN. Furthermore, the various devices and components described above may be implemented in hardware, software, or a combination thereof, and may be implemented as separate physical devices or may be combined. Thus, the call server may include a software routine to convert text to speech, or the text-to-speech conversion may be accomplished using a separate stand-alone device. Similarly, the seller web server 120 and the call server 140 may be separate physical devices or may be implemented using a single physical device. Moreover, the seller website 120 and the call server 140 may be administered by the same entity or by different entities, regardless of whether the devices are physically separate or not. Various other modifications are also possible.

It will be apparent to those of skill in the art that numerous variations in addition to those discussed above are also possible. Therefore, while the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

Furthermore, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method for establishing a phone call comprising the steps of:
   receiving, by a call server, a message including information entered by a customer at a website, the message indicating that a customer wishes to be contacted by a sales agent, the message including customer identification information, customer contact information, and product identification information that identifies a good or service in which the customer is interested;
   establishing a first phone call to the customer by a first voice over internet protocol (VoIP) gateway in communication with the call server;
   establishing a second phone call to a sales agent by a second VoIP gateway in communication with the call server;
   converting at least a portion of the message to speech;
   playing the speech to the sales agent in the second phone call;
   bridging the first phone call and the second phone call to connect the sales agent to the customer, wherein the bridging comprises directing an internet protocol output of the first VoIP gateway to an internet protocol input of the second VoIP gateway and directing an internet protocol output of the second VOIP gateway to an internet protocol input of the first VOIP gateway; and
   placing a third phone call to the sales agent using sales agent contact information different from that used on the second call, wherein the first phone call is bridged to the third phone call instead of the second phone call, and wherein the sales agent associated with the second phone call is the sales agent associated with the third phone call.

2. The method of claim 1, wherein at least one of the first phone call and the second phone call is conducted over a public switched telephone network.

3. The method of claim 1, wherein the customer contact information comprises a telephone number.

4. The method of claim 1, wherein the portion of the message converted to speech includes at least a portion of the customer identification information and at least a portion of the product identification information.

5. The method of claim 4, wherein the customer identification information includes the customer name and at least a portion of the customer's name is converted to speech.

6. The method of claim 1, wherein the second phone call is conducted over a public switched telephone network.

7. The method of claim 1, wherein the second and third phone calls are made sequentially.

8. The method of claim 1, wherein the second and third phone calls are made in parallel.

9. The method of claim 1, further comprising the step of sending a text message to the sales agent, the text message including at least a portion of the message that was converted to speech in the converting step.

10. The method of claim 9, wherein the message is an email.

11. The method of claim 9, wherein the message is a short message service (SMS) message.

12. A system for establishing a phone call, the system comprising:
    a call server configured receive a message including information entered by a customer at a website, the information in the message including customer identification information, customer contact information, and product identification information that identifies a good or service in which the customer is interested, the call server including a database that includes at least one sales agent contact data and a text-to-speech module, the call server being configured to perform the steps of
    establishing a first phone call to the customer;
    establishing a second phone call to a sales agent;
    converting at least a portion of the message to speech;
    playing the speech to the sales agent in the second phone call; and
    bridging the first phone call and the second phone call to connect the sales agent to the customer; and
    a first voice over internet protocol (VoIP) gateway in communication with the call server;
    a second VoIP gateway in communication with the call server;
    wherein the first VoIP gateway is used to establish the first phone call, the second VoIP gateway is used to establish the second phone call, and the bridging step is performed by directing an internet protocol output of the first VoIP gateway to an internet protocol input of the second VoIP gateway and directing an internet protocol output of the second VoIP gateway to an internet protocol input of the first VOIP gateway, and
    wherein the call server is further configured to place a third phone call to the sales agent using sales agent contact information different from that used on the second call, wherein the first phone call is bridged to the third phone call instead of the second phone call, and wherein the sales agent associated with the second phone call is the sales agent associated with the third phone call.

13. The system of claim 12, wherein at least one of the first phone call and the second phone call is conducted over the public switched telephone network.

14. The system of claim 12, wherein the customer contact information comprises a telephone number.

15. The system of claim 12, wherein the portion of the message converted to speech includes at least a portion of the customer identification information and at least a portion of the product identification information.

16. The system of claim 15, wherein the customer identification information includes the customer name and at least a portion of the customer's name is converted to speech.

17. The system of claim 12, wherein the second phone call is conducted over the public switched telephone network.

18. The system of claim 12, wherein the second and third phone calls are made sequentially.

19. The system of claim 12, wherein the second and third phone calls are made in parallel.

20. The system of claim 12, wherein the call server is further configured to place any number of calls to a sales agent in addition to the second and third calls.

21. The system of claim 12, wherein the call server is further configured to perform the step of sending a text message to the sales agent, the text message including at least a portion of the message that was converted to speech in the converting step.

22. The system of claim 21, wherein the message is an email.

23. The system of claim 21, wherein the message is a short message service (SMS) message.

24. The system of claim 12, further comprising a web server in communication with the end user terminal via the Internet, the web server being configured to transmit display information to the end user terminal.

25. A non-transitory computer readable medium encoded with instructions that, when executed by a computer, cause the computer to perform:

receiving a message including information entered by a customer at a website, the message indicating that a customer wishes to be contacted by a sales agent, the message including customer identification information, customer contact information, and product identification information that identifies a good or service in which the customer is interested;

establishing a first phone call to the customer by a first voice over internet protocol (VoIP) gateway in communication with the call server;

establishing a second phone call to a sales agent by a second VoIP gateway in communication with the call server;

converting at least a portion of the message to speech;

playing the speech to the sales agent in the second phone call;

bridging the first phone call and the second phone call to connect the sales agent to the customer, wherein the bridging comprises directing an internet protocol output of the first VoIP gateway to an internet protocol input of the second VoIP gateway and directing an internet protocol output of the second VoIP gateway to an internet protocol input of the first VOIP gateway; and placing a third phone call to the sales agent using sales agent contact information different from that used on the second call, wherein the first phone call is bridged to the third phone call instead of the second phone call, and wherein the sales agent associated with the second phone call is the sales agent associated with the third phone call.

26. The computer readable medium of claim 25, wherein the portion of the message converted to speech includes at least a portion of the customer identification information and at least a portion of the product identification information.

27. The computer readable medium of claim 26, wherein the customer identification information includes the customer name and at least a portion of the customer's name is converted to speech.

* * * * *